United States Patent [19]

Mancinelli

[11] Patent Number: 4,640,958
[45] Date of Patent: Feb. 3, 1987

[54] NOVEL COUPLING AGENT FOR STAR-BLOCK COPOLYMERS

[75] Inventor: Paul A. Mancinelli, Aston, Pa.

[73] Assignee: Atlantic Richfield Company, Los Angeles, Calif.

[21] Appl. No.: 768,073

[22] Filed: Aug. 21, 1985

[51] Int. Cl.$^4$ .................. C08F 297/04; C08F 297/02
[52] U.S. Cl. ................................... 525/193; 525/250; 525/271; 525/298; 525/314
[58] Field of Search ............... 525/193, 250, 271, 298, 525/314

[56] References Cited

U.S. PATENT DOCUMENTS 3,786,116 1/1974 Milkovich et al. .................. 525/276
4,039,633 8/1977 Zelinski ................................ 525/314

Primary Examiner—Wilbert J. Briggs, Sr.
Attorney, Agent, or Firm—Lewis J. Young

[57] ABSTRACT

A new coupling agent has been disclosed which is acryloyl chloride. This coupling agent undergoes anionic polymerization through the acrylate unsaturation rather than anionic attack at the acid chloride.

11 Claims, No Drawings

NOVEL COUPLING AGENT FOR STAR-BLOCK COPOLYMERS

BACKGROUND OF THE INVENTION

This invention relates to a new coupling agents for use in preparing star-block polymers and copolymers by solution polymerization or copolymerization of conjugated dienes and monovinyl aromatic monomers with alkyllithium initiators.

Highly branched block copolymers, sometimes called star-block copolymers, are old in the art of anionic polymerization. These star-block copolymers are prepared by first forming linear block polymers having an active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-Bi-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Childers, U.S. Pat. No. 3,637,554, prepares rubbery star-block copolymers having nuclei formed from polyepoxides, polyisocyanates, polyimines, etc., and identical arms from B-Li and A-B-Li.

Fetters et al, U.S. Pat. No. 3,985,830, discloses a product having a nucleus of more than one molecule of m-divinyl-benzene and at least three polymeric arms, each being a block copolymer of conjugated diene and monovinyl aromatic monomers wherein said conjugated diene block is linked to said nucleus.

Kiovsky, U.S. Pat. No. 4,077,893, teaches the use of various coupling agents to prepare lubricating oil additives. Among those coupling agents mentioned is ethyleneglycoldimethacrylate.

Bean et al, U.S. Pat. No. 4,304,886, prepares mixtures of star-block copolymers by coupling lithium metal-terminated polymers or copolymers with a mixture of two different coupling agents having different functionality.

Udipi, U.S. Pat. No. 4,309,517, teaches to use hydrocarbyl esters of N-cyclopropyl-N-hydrocarbylcarbamic acids as coupling agents.

Milkovich et al, U.S. Pat. No. 3,786,116 teaches that polystyryl lithium reacts with methacryloyl chloride or acryloyl chloride to form macromolecular monomers terminated with vinyl ketone groups. The reaction is subject to various side reactions, including further reaction of the vinyl ketone groups with polystyryl lithium to form di- and tri-block copolymers. To allivate this problem, Milkovich et al, U.S. Pat. No. 3,842,059 teaches to first cap the polystyryl lithium with ethylene oxide and then terminate with methacryloyl or acryloyl chloride. This gives good yield of methacrylate or acrylate-terminated macromolecular monomers.

SUMMARY OF THE INVENTION

I have now found that star-block polymers can be prepared having from 4 to 10 arms per molecule by the use of acryloyl chloride as coupling agent.

DESCRIPTION OF THE INVENTION

This invention is applicable to the coupling of living polymer molecules prepared from monovinyl aromatic monomers, conjugated dienes and mixtures thereof using a hydrocarbyllithium initiator such that the polymer or copolymer has a lithium attached to the terminal monomer unit of the polymer chain. The resultant lithium-terminated polymers are then coupled by the addition of acryloyl chloride as a coupling agent to form star-block polymers or copolymers having from 4 to 10 arms.

This invention lies in the use of acrylol chloride as a new coupling agent having the unexpected ability to couple many arms.

The monovinyl aromatic monomer useful in the invention is preferably styrene, but may be alkyl substituted styrenes which have similar copolymerization characteristics, such as, alphamethylstyrene and the ring substituted methylstyrenes, ethylstyrenes and t-butylstyrene.

The hydrocarbyllithium initiators useful in the invention are the known alkyllithium compounds, such as methyllithium, n-butyllithium, sec-butyllithium; the cycloalkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer. The total amount of initiator used depends on the molecular weight and number of polymer chains desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture, or any other impurity which is known to be detrimental to anionic catalyst systems. The temperature of polymerization may be conventionally from 0° to 120° C., and preferably between 40° and 80° C.

Although the precise mechanism of coupling for the acryloyl chloride is not known, the reaction is believed to occur by way of anionic polymerization of the olefinic unsaturation of the acrylate portion of the agent. This would cause a multiple armed copolymer in much the same manner as the coupling with other polymerizable difunctional coupling agent, such as divinylbenzene. Surprisingly methacryloyl chloride either does not undergo the anionic polymerization through the unsaturation of the methacrylate to the same extent as acryloyl chloride or undergoes side reactions to give predominantly diblock or triblock copolymers rather than the desired star-block copolymers. This was surprising because methacrylates normally undergo anionic polymerization more readily than acrylates. The preferred temperature range of coupling is 30° to 100° C.

The amount of coupling agent used in the present process depends on the conditions of reaction and the number of arms desired in the final star-block copolymers. Generally, the agents are used in ratios of the coupling agent to the lithium ion concentration of from 1:1 to 6:1.

The conjugated dienes and/or monovinyl aromatic monomers can be polymerized alone to form homopolymers or in admixture to form random, tapered, true block, or other known structure in the lithium terminated polymers. Resinous polymer arms can be formed by using high monovinyl aromatic monomer concentration such as from 55 to 95 percent by weight based on total monomer. Elastomeric polymers or copolymers will have only from 5 to 55 percent by weight of the monovinyl aromatic monomers present. It is possible, however to make polystyrene homopolymer star-block polymers using the instant acryloyl chloride coupling agent.

Although the following examples are primarily related to high diene copolymers, the examples are not intended to limit the scope of the coupling reaction to the exclusion of high styrene systems.

The following examples are given to illustrate the invention, but not to limit the claims. All parts and percentages are by weight unless otherwise specified.

EXAMPLE I

A one gallon stirred reactor was charged with 2,000 g. of purified cyclohexane and heated to 60° C. A trace of diphenylethylene (0.2 g.) was added to the cyclohexane by means of a hypodermic needle. A solution of sec-butyl-lithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 7.19 m. moles of sec-butyllithium and 230.0 g. of styrene and the reactor held at 60° C. for 25 minutes. Analysis of the solution by U.V. analysis showed that less than 0.01% by weight of the styrene monomer remained. Number averaged molecular weights ($M_n$) of the polystyrene blocks were determined by Gel Permeation Chromatography to be 32,000. At this point, 269.7 g. of butadiene was added to the reactor and the whole mixture held for 60° C. for 75 minutes to complete the polymerization of the butadiene. The diblock arms thus formed were analyzed by refractive index and found to be 46% by weight styrene and 54% butadiene. There was then added 14.38 m. mole of acryloyl chloride and the whole was held for 90 minutes at 60° C. to complete the linking reaction. The system was terminated by the addition of 1 g. of methanol. The polymer was then treated with 0.5 part Polygard HR, a commercial antioxidant, and 0.5 part 2,6-ditert-butyl-4-methylphenol per 100 parts by weight of polymer. The polymer solution was air dried to remove most of the solvent and then the polymer was dried at 50° C. in an oven under vacuum at less than 100 microns of mercury.

Analysis of the resulting polymer mixture by Gel Permeation Chromatography showed 5% by weight unlinked polystyrene, 65% by weight unlinked diblock polymers, 10% by weight linked triblock polymers, and 20% by weight star-block polymer having about 5.0 linear diblock arms per molecule. Each arm has $M_n$ of about 69,565, made up of a polystyrene block of $M_n$ 32,000 and a polybutadiene block of $M_n$ 37,565. The acryloyl chloride was present in an amount of 2 parts of coupling agent per part of butyllithium initiator.

EXAMPLE II

The procedure of Example I was repeated except the acryloyl chloride/lithium initiator ratio was 5.0.

The resulting polymer mixture contained 5% by weight unlinked polystyrene, 10% by weight of unlinked diblock polymer, 25% by weight of linked triblock copolymer and 60% by weight of a star-block copolymer having about 4.8 linear arms per molecule. Each arm had $M_n$ as in Example I. Comparison of Example II with Example I indicates that the use of higher ratios of coupling agent to lithium gave increased yields of star-block copolymer.

EXAMPLE III

A one gallon stirred reactor was charged with 2,000 g. of purified cyclohexane and heated to 60° C. A trace of diphenylethylene (0.2 g.) was added to the cyclohexane by means of a hypodermic needle. A solution of sec-butyl-lithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 14.28 m. moles of sec-butyllithium and 500 g. of styrene and the reactor held at 60° C. for 25 minutes. Analysis of the solution by U.V. analysis showed that less than 0.01% by weight of the styrene monomer remained. Number average molecular weights ($M_n$) of the polysyrene blocks were determined by Gel Permeation Chromatography to be 35,000. There was then added 15.71 m. mole of acryloyl chloride and the whole was held for 90 minutes at 60° C. to complete the linking reaction. The system was terminated by the addition of 1 g. of methanol. The polymer was then treated with 0.5 part Polygrad HR, a commercial antioxidant, and 0.5 part 2,6-ditert-butyl-4-methylphenol per 100 parts by weight of polymer. The polymer solution was air dried to remove most of the solvent and then the polymer was dried at 50° C. in an oven under vacuum at less than 100 microns of mercury.

Analysis of the resulting polymer mixture by Gel Permeation Chromatography showed 15.7% by weight unlinked polystyrene and 84.3% by weight star-block polymer having about 4.5 linear arms per molecule. The acryloyl chloride was present in an amount of 1.1 parts of coupling agent per part of butyllithium initiator. Table I summarizes the results of several runs made with varying coupling agent to lithium ratios. Two runs are shown using methacryloyl chloride as coupling agents. It can be seen from runs 4 and 5 that methacryloyl chloride gives only 2 to 3 armed copolymers, even at agent/Li ratios of 5.

TABLE I

| Run No. | coupling agent | agent/Li ratio | % unlinked | Copolymer M.W. | Avg. No. of arms |
|---|---|---|---|---|---|
| 1 | A.C. | 1.1 | 15.7 | 157,500 | 4.5 |
| 2 | A.C. | 2 | 21.5 | 175,000 | 5.0 |
| 3 | A.C. | 5 | 11.0 | 147,000 | 4.2 |
| 4 | M.C. | 2 | — | 94,500 | 2.7 |
| 5 | M.C. | 5 | — | 84,000 | 2.4 |

A.C. = acryloyl chloride
M.C. = methacryloyl chloride

EXAMPLE IV

A one gallon stirred reactor is charged with 1820 g. of purified cyclohexane and heated to 80° C. The solvent is treated with diphenylethylene and sec-butyllithium to remove impurities as in Example I. Into the closed reactor is charge 9.8 m. mole of sec-butyllithium and 147 g. of styrene and the reactor held at 60° C. for 10 minutes. The polystyrene was completely polymerized to a polymer $M_n$ 15,000. An additional 9.8 m mole of sec-butyl-lithium is then added and a continuous feed of 833 g. of isoprene is added over a period of 30 minutes using a controlled volume minipump. When the last of the isoprene is added, the whole mixture is maintained at 60° C. for an additional 15 minutes. At this point, the mixture contained equal amounts of two different polymeric chains having lithium end groups. One group of chains consists of a diblock copolymer having polystyrene blocks of $M_n$ 15,000 followed by polyisoprene blocks of $M_n$ 42,500. The other group of chains consists of polyisoprene of $M_n$ 42,500. In both cases, lithium is attached to the isoprene end of the chains. The solution containing these living polymer chains is then reacted with 98.0 m mole of acryloyl chloride at 60° C. for 90 minutes to form a star-block copolymer having statistically equal numbers of the two types of arms. The system is terminated with methanol, treated with antioxidants, and the polymers recovered as before. There is 5 wt-% unlinked polystyrene, 10 wt-% unlinked diblock and polyisoprene homopolymer block, 25 wt-% diarm content, and 60 wt-% star-block copolymer content. The star-block copolymer has $M_n$ 500,000, indicating the presence of 10 arms, 5 of the poly(-styreneisoprene) structure and 5 of the polyisoprene structure. The overall composition of the copolymer is 15% by weight of styrene and 85% by weight of isoprene.

What is claimed is:

1. In a process for the preparation of star-block homopolymers and copolymers of conjugated diene monomers and/or monovinyl aromatic monomers by the solution polymerization of the monomers with 0.2 to 10 millimoles per mole of monomers of a monolithium initiator and then coupling the resultant lithiated homopolymer or copolymer with a coupling agent, the improvement comprising using as the coupling agent acryloyl chloride wherein the ratio of acryloyl chloride to monolithium initiator is between 1 to 1 and 6 to 1.

2. The process of claim 1 wherein said conjugated diene monomers have 4 to 8 carbon atoms in the molecule and are selected from the group consisting of 1,3-butadiene, isoprene, 2,3-dimethyl-1,3-butadiene, piperylene and mixtures thereof, and said monovinyl aromatic monomers are selected from the group consisting of styrene, alpha-methylstyrene, ring-substituted methylstyrene, ethylstyrenes, t-butylstyrenes and mixtures thereof.

3. The process of claim 1 wherein the lithiated copolymer to be coupled is a block copolymer of 25-55 wt-% monovinyl aromatic monomer and 45-75 wt-% conjugated diene having the lithium attached to the diene block.

4. The process of claim 1 wherein the lithiated copolymer to be coupled is a mixture of (a) block copolymer of monovinyl aromatic monomer and conjugated diene and (c) polyconjugated diene.

5. The process of claim 1 wherein the lithiated copolymer to be coupled is a block copolymer of 55-90 wt-% of monovinyl aromatic monomer and 5-45 wt-% of conjugated diene having the lithium attached to the diene block.

6. A star-block polymer having 4 to 10 arms attached to a nucleus made up of more than one molecule of acryloyl chloride; said arms being selected from the group consisting of homopolymers of monovinyl aromatic monomers, homopolymers of conjugated diene monomers, copolymers of monovinyl aromatic monomers and conjugated diene monomers, and mixtures of these.

7. The star-block polymer of claim 6 wherein said arms are homopolymers of monovinyl aromatic monomers.

8. The star-block polymer of claim 6 wherein said arms are homopolymers of conjugated diene monomers.

9. The star-block polymers of claim 6 wherein said arms are copolymers containing 5-95 percent by weight of total monomers of monovinyl aromatic monomer and 95-5 percent by weight of total monomers of conjugated diene monomer.

10. The star-block polymers of claim 9 wherein the copolymers are selected from the group consisting of, true diblock, random block, tapered block, and mixtures of these copolymers.

11. The star-block polymer of claim 6 wherein said arms are mixtures of a polyconjugated diene homopolymer and a block copolymer of a monovinyl aromatic monomer and a conjugated diene monomer.

* * * * *